UNITED STATES PATENT OFFICE.

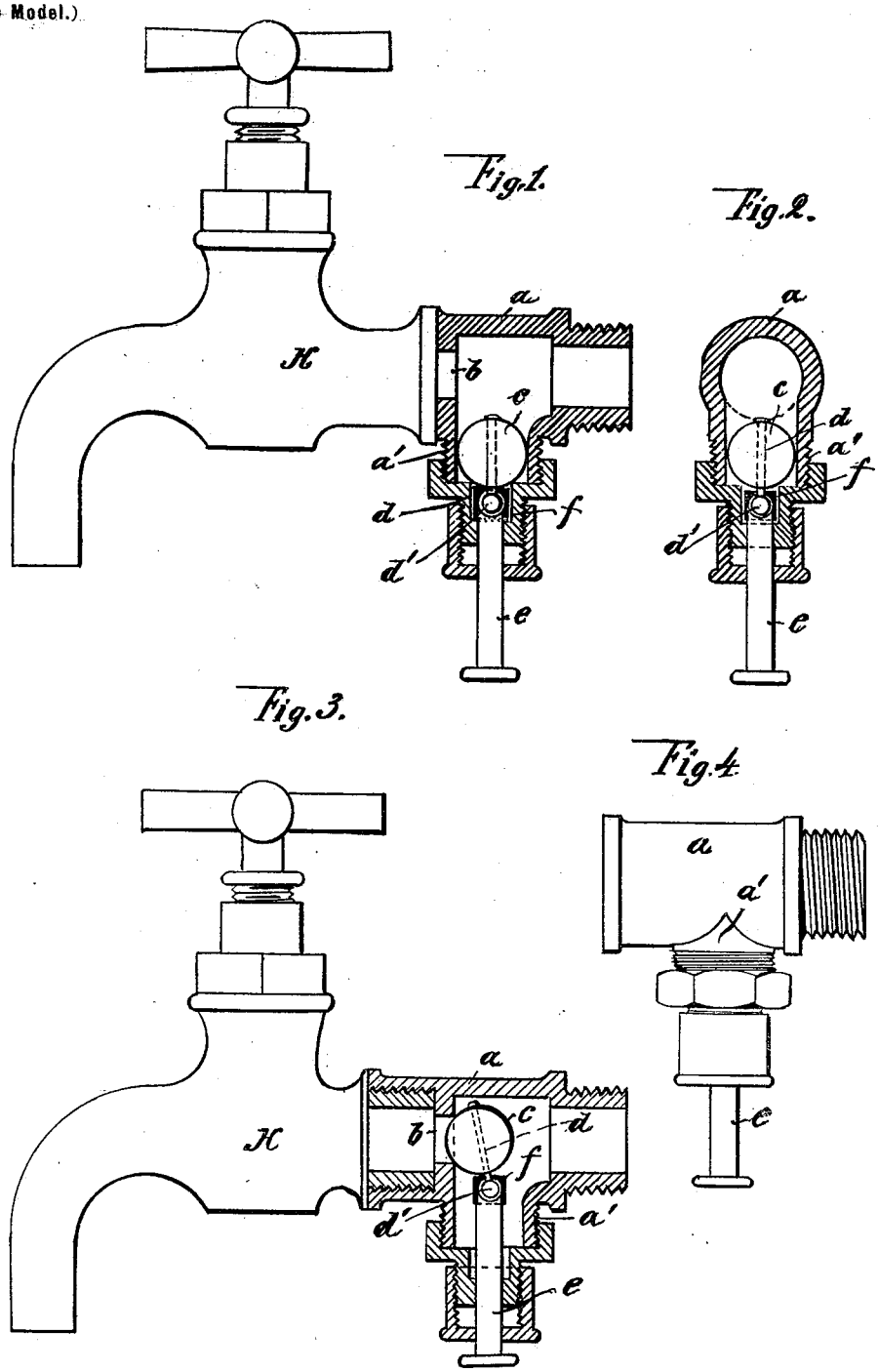

HERMANN MOERES, OF EITORF, GERMANY.

CUT-OFF COCK OR VALVE WITH SEPARATE CLOSING DEVICE.

SPECIFICATION forming part of Letters Patent No. 658,797, dated October 2, 1900.

Application filed November 13, 1899. Serial No. 736,862. (No model.)

*To all whom it may concern:*

Be it known that I, HERMANN MOERES, a subject of the King of Prussia, German Emperor, residing at Eitorf-on-the-Sieg, in the Kingdom of Prussia, Germany, have invented certain new and useful Improvements in Cut-Off Cocks or Valves with Separate Closing Devices, (for which I have applied for patents in England, No. 12,224, dated June 12, 1899; in Germany, dated April 29, 1899; in France, No. 277,898, dated June 15, 1899, and in Belgium, No. 143,239, dated June 14, 1899,) of which the following is a specification.

As is well known, it is a very great drawback that, especially in the case of service water cocks or valves, a leakage of the packing or of the plug or valve piece, or even the carrying out of repairs, necessitates the shutting off of the entire main service, which leads to many inconveniences, especially in large households.

Now the present invention has for its object to remove these drawbacks by means of the arrangement between the service-pipe and the water cock or valve of a further separate closing device, which in such cases can be operated by a simple manipulation, and thus prevents the further flow of water, and in which case the pressure existing in the water-pipe itself effects a good and tight closure by means of the closing part.

In the annexed drawings, illustrating the invention, Figure 1 is a side elevation, partly in section, illustrating my invention. Fig. 2 is a cross-sectional view taken through the auxiliary closing device. Fig. 3 is a view similar to Fig. 1, but showing the auxiliary closing device in its cut-off position. Fig. 4 is a detail plan view of the tubular part carrying the auxiliary closing device.

According to this invention the object is not the provision of an additional cock-plug or the like; but the invention consists in providing a device which can be applied in a very unnoticeable manner and without appreciable increase of the total cost to every hydrant or water-valve, and even to steam or gas cut-off valves and cocks. The means employed for effecting this purpose are extremely simple and consists, as shown in one construction, by way of example, in the annexed drawings, first, of a tubular piece $a$, which is fixed, by means of a screw-thread, to the closing part, in the present case to a service water-cock H, in the interior of which there is provided a ball-valve $c$ for the purpose of closing temporarily the aperture $b$ of the pipe. This ball-valve $c$, which is preferably made of rubber, caoutchouc, vulcanized fiber, or in the case of steam-pipes may be made of metals or other suitable material, is fixed to a pin $d$, which is formed at its lower end with a spherical extension $d'$. This extension engages in a corresponding hemispherical recess in a vertically-movable spindle $e$ in such a manner that the ball $c$ can within certain limits move freely in all directions and can rotate in a circle. The pin $d$ and the ball $e$ are, however, prevented from falling out of the mounting in the spindle $e$ by means of a cap $f$, which is slipped over the upper end of the spindle $e$ and the spherical extension $d'$ and which also limits exactly the rotary motion of the ball. On the tubular piece $a$ there is provided at the lower part a tubular portion $a'$, over which there is slipped a nut with a lock-nut, which serves in this manner partly to guide the spindle $e$ in a straight line and partly, by means of an inserted packing, to produce a tight joint against the periphery of the spindle $e$. If the packing in the tubular part should become defective, then the ball $c$ in this case also forms a closure by bearing upon the hole in the stuffing-box seat, and thus prevents the pressure fluid from passing out along the spindle $e$. Normally—that is to say, when it is not necessary to shut off the cock H for the purpose of effecting repairs—the ball $c$ is situated in the lower part of the tubular part $a$, as indicated in Fig. 1, in which position the pressure fluid surrounds the ball on all sides, so that the several pressures upon the same balance one another mutually. If, however, the cock H has to be screwed out, the spindle $e$ is pressed up with the thumb (after the cock has been opened a short time before) to about the extent shown in Fig. 3. In this position the valve-piece $e$ is situated just in front of the outflow-passage $b$, and the water flowing through the pipe consequently exerts a pressure upon the ball $c$, which is not balanced by any other oppositely-directed pressure in front of the aperture $b$. Consequently the rod $d$ swings in obedience to the pressure toward the left hand and the ball $c$ bears against the aperture $b$, which forms a valve-seat with its edges, so as to produce at once a cutting off of the flow of water by its own pressure. When the repair of the cock H is finished, a slight downward pressure exerted upon the spindle $e$ is sufficient to throw the shutting-off device out of operation again.

What I claim, and desire to secure by Letters Patent of the United States, is—

1. In combination with a cock or faucet, a freely-movable ball-valve arranged to close the inlet-opening leading to said cock or faucet, means for bringing the said ball-valve into and out of coincidence with the said inlet-opening, and a universal-joint connection between said valve and means, substantially as described.

2. In combination with a cock or faucet, a ball-valve arranged to close the inlet-opening leading to said cock or faucet, a pin upon which said ball-valve is freely mounted, a spherical head upon one end of said pin, a sliding rod for bringing the ball-valve into and out of coincidence with the said inlet-opening, and a socket upon one end of said rod fitting over the spherical end of the pin and forming a universal-joint connection therewith, substantially as described.

3. In combination with a cock or faucet, a ball-valve arranged to close the inlet-opening leading to said cock or faucet, a pin upon which said valve is mounted, a sliding rod for bringing the ball-valve into and out of coincidence with the said inlet-opening, and a universal-joint connection between said sliding rod and pin, substantially as described.

In testimony whereof I have hereunto set my hand in the presence of two witnesses.

HERMANN MOERES.

Witnesses:
NIKOLAUS METERER,
WILLIAM H. MADDEN.